United States Patent Office 2,705,317
Patented Mar. 29, 1955

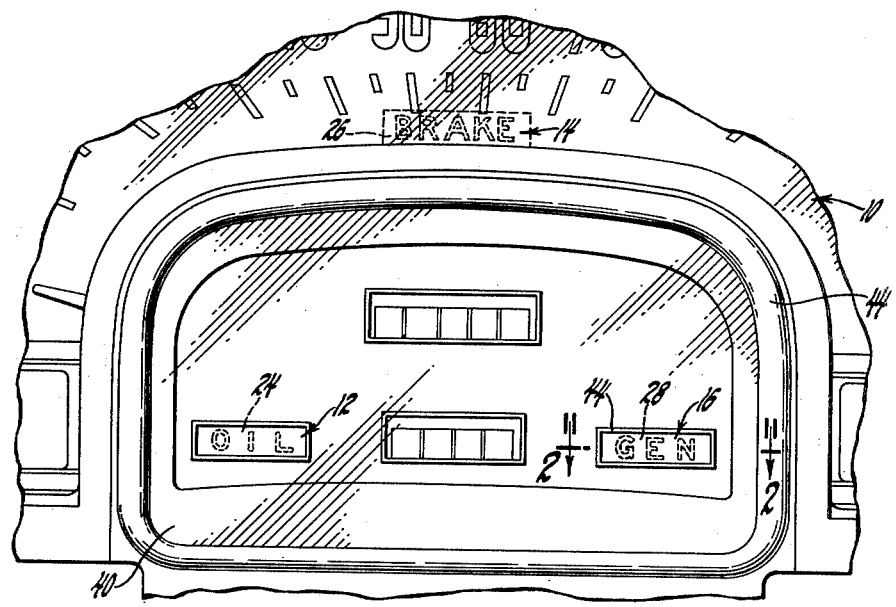
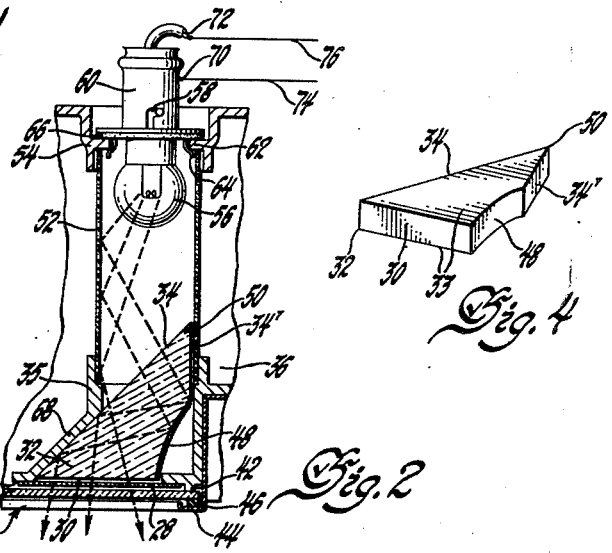
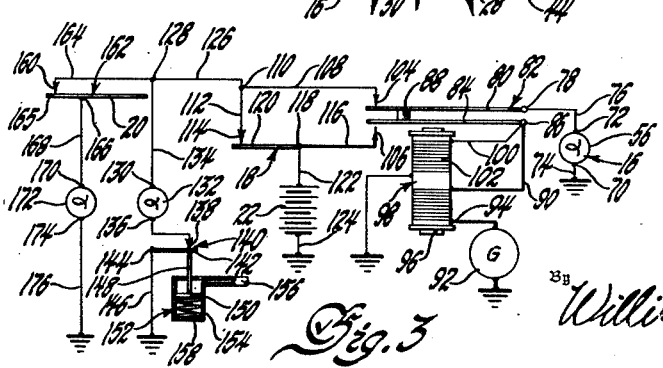

2,705,317

ILLUMINATABLE SIGNALS

Arthur W. Hills, Flushing, Mich., assignor to General Motors Corporation, Detroit, Mich., a corporation of Delaware Application April 2, 1951, Serial No. 218,730

7 Claims. (Cl. 340—381)

This invention relates to illuminatable signals and more particularly to tell-tale signals associated with certain apparatus provided on motor vehicles.

It sometimes occurs that a driver, after parking his vehicle, will apply the emergency brake and inadvertently neglect to turn off the ignition switch. This, obviously, not only results in needless operation of the engine or loss of electric power but might also cause damage, especially, in the absence of the driver. Operation of a vehicle while the emergency brake is applied also sometimes occurs causing undue wear as well as damage to operating parts. It also frequently occurs that a driver of a vehicle may fail to observe the oil pressure guage and as a result undue wear or even damage to certain operating parts might occur before this abnormal condition has been detected. It is also seen that should the driver fail to observe the ammeter in the electric circuit of his vehicle rapid discharge of the battery will result causing inconvenience and expense to the said driver.

One object of the present invention is to provide novel and highly improved tell-tale signals which operate, when the vehicle ignition switch is closed, to warn the driver, respectively, when the emergency brake is applied, when the oil pressure is below normal and when the generator is not functioning properly.

Another object is to provide a cluster of tell-tale signals on the instrument panel of a vehicle to warn the driver thereof when improper conditions develop in certain of the mechanisms thereof.

A broader object is to provide a novel illuminatable means which is uniformly lighted so as to be clearly visible under all lighting conditions.

A further object is to provide novel illuminatable means which is at least partially offset from a source of light and yet is uniformly illuminated so as to be clearly visible.

A still further object is to provide a prominently illuminated signal which is uniformly lighted so as to be clearly visible at all times.

A more specific object is to provide a signal comprising a prominently colored translucent indicia mask, a prism operatively associated with said mask and arranged to transmit light uniformly over the entire area of said mask.

Other and further objects reside in certain details of construction and arrangement of parts which will become apparent as the description of the invention progresses.

Of the drawings—

Fig. 1 is an elevational view of a fragmentary portion of the instrument panel of a motor vehicle showing a cluster of tell-tale signals mounted thereon.

Fig. 2 is a sectional view taken substantially along line 2—2 of Fig. 1 showing the source of light and the light transmitting means associated with one of the tell-tale signals.

Fig. 3 is a diagrammatic view including a wiring diagram of the electric circuit associated with the tell-tale signals and other electrical devices of a motor vehicle, and Fig. 4 is a perspective view of the prism associated with the signals.

Referring to the drawing the numeral 10 designates generally the instrument panel of a motor vehicle which has mounted thereon in any suitable manner tell-tale signals 12, 14, and 16. Signals 12, 14, and 16 operate only when the ignition switch 18 is closed, and, as will appear more fully hereinafter, signal 12 is energized when the oil pressure becomes abnormally low, signal 14 is energized when the parking or emergency brake 20 has been applied and signal 16 is energized when the battery 22 of the vehicle is discharging or the generator fails to function properly. Signal 12 includes a translucent mask 24 constructed of cellulose nitrate and commonly known as "Pyralin" or of any other suitable material. Mask 24 is colored red to indicate danger and has the word "Oil" marked thereon in black letters. The masks 26 and 28 for signals 14 and 16 are also colored red and have "Brake" and "Gen," respectively, marked thereon in black letters. Inasmuch as the structure of each of the signals 12, 14 and 16 is the same a detail description of signal 16 will suffice for all.

As shown more particularly in Fig. 2 the front side surface 30 of a prism 32 is disposed adjacent the inner surface of mask 28. Prism 32 has substantially flat top and bottom surfaces 33, 33 and substantially right isosceles triangularly arranged side surfaces indicated at 30, 34 and 34′. Prism 32 is mounted in a housing 35 which in turn is secured to the supporting frame 36 of the instrument panel in any suitable manner. Surface 30 may be considered as the light outlet portion of the prism and surfaces 34 and 34′ the light inlet portion thereof. Prism 32 may be constructed of any suitable material such, for example, as the thermoplastic methyl-methacrylate resin commonly known as "Lucite." Mask 28 is secured to the front end 38 of housing 35 in any suitable fashion. A transparent protective panel 40 constructed of glass or of any other suitable material is secured against the projections 42 (only one of which is shown) provided at the front end of housing 35 by an overlapping flange 44. Flange 44 extends around the perimeter of panel 40 as shown in Fig. 1. An anti-rattle gasket 46 is provided between flange 44 and panel 40. The projections 42 hold the panel 40 in slightly spaced relation with respect to mask 28.

The apex of prism 32, preferably, is cut away to form a slightly rounded reflecting surface 48. The inner end 50 of prism 32 extends into a tube 52 secured at one end in any suitable fashion to housing 35. The other end of tube 52 is attached to a retaining bracket 54 mounted in any suitable manner on frame 36. An incandescent lamp 56 mounted in the socket 58 of an electrical fixture 60 extends into the inner end of tube 52 and when energized causes illumination of signal 16. Bracket 54 has provided thereon an annular flange 62 which is resiliently engaged by the spring retaining arms 64 extending from a retaining collar 66 secured to fixture 60. When in assembled position collar 66 abuts the outer surface of flange 62 and thus limits the movement of fixture 60 into the tube 52. The interior of tube 52 may be painted white or any other good light reflecting color and, accordingly, an optimum of light from lamp 56 will be transmitted to prism 32 which in turn evenly distributes the light so transmitted over the entire surface of mask 28. The wall 68 of housing 35 opposite the curved surface 48 of prism 32 is inclined to receive the outer portion of the long side 34 of said prism and also acts as a reflecting surface, directing the rays, as shown by arrows in Fig. 2, in the direction of mask 28. It therefore is seen that in addition to the direct light rays from lamp 50, the rays impinging against the inner surface of tube 52, rather than being absorbed thereby, are in turn directed, as shown by broken lines in Fig. 2, to prism 32. The light rays striking curved surface 48 are directed across the prism to wall 68 and thence, as previously pointed out, in the direction of mask 28. The curved surface 48 may be painted or otherwise coated with a light deflecting material, if it is so desired, to increase the effectiveness thereof. By this construction the light rays from the light source 56 are uniformly distributed over the entire area of the front or light outlet side 30 of prism 32 and consequently the entire area of mask 28 will be uniformly illuminated.

The electric terminals 70 and 72 of fixture 60 have connected thereto conductors 74 and 76, respectively. Conductor 74 is connected to ground while conductor 76 is connected to the terminal 78 of blade 80 of a two blade switch 82. The second blade 84 of switch 82 is connected to a second terminal 86. The blades 80 and 84 are held in spaced relation by an insulated connector 88.

A main conductor 90 is connected at one end to terminal 86 and at the other end to an electric generator 92. The intermediate portion 94 of conductor 90 is wound about the lower end of the core 96 of a solenoid 98 and constitutes a portion of the coil thereof. A second conductor 100 is connected at one end to terminal 86 and is wound about the upper end of core 96, as shown at 102, and is then connected to ground. Blades 80 and 84 of switch 82 are of leaf spring construction and are adapted to engage contact elements 104 and 106, respectively. When solenoid 98 is de-energized blades 80 and 84 by spring action move upwardly as shown in Fig. 3 causing blade 80 to engage contact element 104. When solenoid 98 is energized blades 80 and 84 are moved downwardly thereby causing blade 84 to engage contact element 106. It therefore is seen that when generator 92 is functioning properly current therefrom will flow through conductor 90, terminal 86, conductor 100, coil 102, and thence to ground, thereby energizing solenoid 98 which in turn moves switch blades 80 and 84 downwardly against the spring action thereof, causing blade 84 to engage contact element 106. The circuit between generator 92 and battery 22 is thus closed and the former operates to charge the latter. When blades 80 and 84 are so actuated contact is broken between blade 80 and contact element 104 and as a result the circuit to lamp 32 is broken. Should generator 92 fail to operate properly, switch blades 80 and 84 will move upwardly by the spring action thereof to make contact between blade 80 and contact element 104 and thereby energize the circuit from battery 22 to lamp 56. Signal 16 is thus illuminated to warn the driver of the condition of generator 92. At the same time contact is broken between switch blade 84 and contact element 106, thereby disconnecting the generator 92 from battery 22.

A conductor 108 connects contact element 104 with a terminal 110, the latter being connected by a conductor 112 to the contact element 114 of ignition switch 18. Contact element 106 of switch 82 is connected by a conductor 116 to a second terminal 118 of ignition switch 18 to which the blade 120 of said switch is also connected. A conductor 122 connects one side of battery 22 to terminal 118, the other side of said battery being connected to ground by a conductor 124.

A conductor 126 connects terminal 110 to a terminal 128 the latter of which being connected to terminal 130 of the incandescent lamp 132 associated with signal 24 by a conductor 134. The second terminal 136 of lamp 132 is connected to the contact 138 of an oil pressure switch 140. The blade 142 of switch 140 is connected to a terminal 144 which in turn is connected to ground by a conductor 146. Blade 142 of switch 140 is operatively connected to the piston rod 148 of the piston 150 of a servomotor 152. Fluid from the oil line is introduced to one end of the cylinder 154 of motor 152 through a pipe connection 156 and when the pressure thereof acting on one side of piston 150 is sufficient to over come the pressure of a spring 158 acting against the other side of said piston switch 140 will open. The spring may be selected to resist a predetermined pressure, and when the oil pressure falls below this value, spring 158 will operate piston 150 in the reverse direction to close switch 140. The circuit between battery 22 through lamp 132 is now energized causing illumination of signal 12. The driver is thus warned that the oil pressure is improperly low.

Terminal 128 is connected to the contact element 160 of a parking brake switch 162 by a conductor 164. The blade 165 of switch 162 is connected to a terminal 166, which in turn is connected by a conductor 168 to one terminal 170 of the incandescent lamp 172 associated with brake signal 14. The other terminal 174 of lamp 172 is connected to ground by a conductor 176. The parking or emergency brake lever 20 is so connected to switch 162 that when the said brake is applied blade 164 engages contact element 160 and closes the said switch. The circuit from battery 22 through lamp 172 is now energized causing illumination of signal 14. The driver is thus warned that the parking or emergency brake has been applied while the ignition switch 18 is closed.

From the foregoing description it is seen that highly effective tell-tale signalling means has been devised. As soon as any improper operation occurs the operator is immediately warned so that corrective steps might be taken. The novel light transmitting means also operates in such a manner that the light from the source is uniformly distributed over the entire area of the signal masks. Efficient means have also been provided to prevent loss of light between the source and the signal masks. The invention, for the purpose of illustration, has been described in connection with signal means. It is apparent, however, that the invention is equally adapted for use in connection with other types of illuminatable displays that might be employed for numerous and varied purpose.

While but a single embodiment of the invention has been shown and described herein it is apparent to those skilled in the art that the disclosed structure might be modified or embodied in other forms without departing from the invention. It is therefore to be understood that it is not intended to limit the invention to the single embodiment disclosed but only by the scope of the claims which follow.

What is claimed is:

1. In a device of the class described, the combination of a source of light, a prism having a light inlet portion and a light outlet portion, said light outlet portion including a surface disposed transversely of the path of light from said light source, said light inlet portion extending in the general direction of said light source, means for concealing from said light source a portion of said light inlet portion disposed toward said light outlet portion, and an arcuate light deflecting surface on said prism for deflecting light from said source over the portion of said prism concealed from said light source, whereby the light from said source is uniformly distributed over the entire area of said outlet surface.

2. A illuminatable device comprising, an illuminatable indicia mask, a source of light, a prism for transmitting and uniformly distributing light from said source over the entire area of said mask, said prism comprising an extended relatively flat light outlet portion and an angularly disposed light inlet portion diverging towards said outlet portion, casing means for said prism partially concealing said light outlet portion and said mask from said light source, and arcuate light deflecting means disposed in said prism between said portions for deflecting light from said light source across said prism and over the said partially concealed portion thereof.

3. A transparent prism adapted to be mounted between an indicator and a source of illumination so as to diffuse the light from said source uniformly across the face of said indicator, said prism comprising a light inlet surface adapted to be exposed to said source of illumination, an outlet surface disposed on a side of said prism opposite from said inlet surface, said outlet surface being adapted to be positioned adjacent said indicator, said surfaces being angularly disposed with respect to each other, and an arcuate light reflecting surface disposed in line with said inlet surface and being adapted to diffuse light throughout said prism.

4. A transparent prism adapted to be mounted adjacent an indicator so as to diffuse the light from a source of illumination uniformly across a transparent face on said indicator, said prism having three obliquely disposed sides, the first of said sides forming an inlet surface adapted to be exposed to said source of illumination, the second of said sides forming an outlet surface adapted to be positioned adjacent said face, and the other of said sides having an offset portion forming a light reflecting surface in line with said inlet surface, said portion being adapted to diffuse the light from said inlet surface throughout said prism.

5. A signaling device comprising an elongated tubular member, a source of illumination disposed in one end of said tubular member, a transparent indicator disposed across the opposite end of said tubular member, a transparent prism mounted in said tubular member and being disposed in substantial alignment between said indicator and said source of illumination, an inlet surface on said prism positioned in said tubular member and being exposed to said source of illumination, an outlet surface on said prism disposed adjacent said indicator, and an arcuate light reflecting portion disposed in said prism between said surfaces.

6. A signaling device comprising an elongated tubular member, a source of illumination disposed in one end of said tubular member, a transparent indicator disposed across the opposite end of said tubular member, a transparent prism mounted in said tubular member and being disposed in substantial alignment between said indicator and said source of illumination, an inlet surface on said prism positioned obliquely across said tubular member and being exposed to said source of illumination, an outlet surface on said prism disposed adjacent said indicator, and an offset portion on one side of said prism disposed between said surfaces and forming a light reflecting surface adapted to disperse light throughout said prism.

7. A signaling device comprising elongated tubular means, a source of illumination disposed in one end of said tubular means, a transparent indicator disposed across the opposite end of said tubular means, a transparent prism mounted in said tubular means and being disposed in substantial alignment between said indicator and said source of illumination, said prism having at least three sides, with one of said sides forming an inlet surface and another of said sides forming an outlet surface, a portion of said inlet surface being exposed to said source of illumination and the remaining portion of said inlet surface being concealed from said source of illumination by said tubular means, said outlet surface being disposed adjacent said indicator and an offset portion in said third side forming a light reflecting surface disposed in said prism between said surfaces.

References Cited in the file of this patent

UNITED STATES PATENTS

| | | |
|---|---|---|
| 1,460,500 | Rall | July 3, 1923 |
| 1,481,471 | La Londe | Jan. 22, 1924 |
| 2,309,277 | Sams | Jan. 26, 1943 |
| 2,343,394 | Blomberg et al. | Mar. 7, 1944 |
| 2,437,555 | Rees | Mar. 9, 1948 |
| 2,497,029 | Korte et al. | Feb. 7, 1950 |
| 2,511,631 | Gordon | June 13, 1950 |
| 2,542,930 | Lancaster | Feb. 20, 1951 |